(12) United States Patent
Suh et al.

(10) Patent No.: US 7,155,087 B2
(45) Date of Patent: Dec. 26, 2006

(54) PHOTONIC CRYSTAL REFLECTORS/FILTERS AND DISPLACEMENT SENSING APPLICATIONS

(75) Inventors: Wonjoo Suh, Stanford, CA (US);
Mehmet Fatih Yanik, Stanford, CA (US); Olav Solgaard, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 121 days.

(21) Appl. No.: 10/682,576

(22) Filed: Oct. 8, 2003

(65) Prior Publication Data

US 2004/0080726 A1 Apr. 29, 2004

Related U.S. Application Data

(60) Provisional application No. 60/417,890, filed on Oct. 11, 2002.

(51) Int. Cl.
*G02B 6/26* (2006.01)
*G02B 6/24* (2006.01)
(52) U.S. Cl. ............... 385/27; 385/15; 385/31; 385/39; 385/129; 385/147
(58) Field of Classification Search ........ 385/129–132, 385/15, 31, 39, 147
See application file for complete search history.

(56) References Cited

U.S. PATENT DOCUMENTS 6,574,383 B1 * 6/2003 Erchak et al. ............... 385/15

6,870,624 B1 * 3/2005 Hobbs et al. ............... 356/416

OTHER PUBLICATIONS

Kittel, "Introduction to Solid State Physics," 7th Edition, *John Wiley & Sons*, New York, 1996, pp. 4-5.
Noda et al., "Polarization Mode Control of Two-Dimensional Photonic Crystal Laser by Unit Cell Structure Design," www.sciencemag.org, Aug. 10, 2001, vol. 293, pp. 1123-1125.
Loh et al., "Sub-10 $cm^3$ Interferometric Accelerometer with Nano-g Resolution," *Journal of Microelectromechanical Systems*, vol. 11, No. 3, Jun. 2002, pp. 182-187.
Erchak et al., Enhanced Coupling to Vertical Radiation Using a Two-Dimensional Photonic Crystal in a Semiconductor Light-Emitting Diode, *Applied Physics Letters*, vol. 78, No. 5, Jan. 29, 2001, pp. 563-565.
Ryu et al., "Over 30-Fold Enhancement of Light Extraction from Free-Standing Photonic Crystal Slabs with IngaAs Quantum Dots at Low Temperature," *Applied Physics Letters*, vol. 79, No. 22, Nov. 26, 2001, pp. 3573-3575.
Meier et al., "Laser Action from Two-Dimensional Distributed Feedback in Photonic Crystals," *Applied Physics Letters*, vol. 74, No. 1, Jan. 4, 1999, pp. 7-9.

(Continued)

*Primary Examiner*—Frank G. Font
*Assistant Examiner*—Michael P. Mooney
(74) *Attorney, Agent, or Firm*—Parsons Hsue & de Runtz LLP

(57) ABSTRACT

We introduce a mechanically tunable photonic crystal structure consisting of coupled photonic crystal slabs. Using both analytic theory, and first-principles finite-difference time-domain simulations, we demonstrate that the transmission and reflection coefficients for light normally incident upon such structures can be highly sensitive to nano-scale variations in the spacing between the slabs. Moreover, by specifically configuring the photonic crystal structures, the high sensitivity can be preserved in spite of significant fabrication-related disorders. We expect such a structure to play important roles in micro-mechanically tunable optical sensors and filters.

5 Claims, 8 Drawing Sheets

OTHER PUBLICATIONS

Fan, "Temporal Coupled Mode Theory for the Fano Resonance in Optical Resonators," pp. 1-14.

Magnusson et al., "New Principle for Optical Filters," *Appl. Phys. Letter*, 61 (9), Aug. 31, 1992, pp. 1022-1024.

Ochiai et al., "Dispersion Relation and Optical Transmittance of a Hexagonal Photonic Crystal Slab," *Physical Review B*, vol. 63, 125107-1 to 125107-7.

Solgaard et al., "Deformable Grating Optical Modulator," *Optics Letters*, vol. 17, No. 9, May 1, 1992, pp. 688-690.

Hagelin et al., "Scalable Optical Cross-Connect Switch Using Micromachined Mirrors," *IEEE Photonics Technology Letters*, vol. 12, No. 7, Jul. 2000, pp. 882-884.

Chang-Hasnain, "Tunable VCSEL," *IEEE Journal on Selected Topics in Quantum Electronics*, vol. 6, No. 6, Nov./Dec. 2000, pp. 978-987.

Kanskar et al., "Observation of Leaky Slab Modes in an Air-Bridged Semiconductor Waveguide with a Two-Dimensional Photonic Lattice," *Appl. Phys. Lett.*, 70 (11), Mar. 17, 1997, pp. 1438-1440.

Astratov et al., "Resonant Coupling of Near-Infrared Radiation to Photonic Band Structure Waveguides," *Journal of Lightwave Technology*, vol. 17, No. 11, Nov. 1999, pp. 2050-2057.

Fan et al., "Analysis of Guided Resonances in Photonic Crystal Slabs," *Physical Review B*, vol. 65, 235112-1 to 235112-8.

Hocker et al., "The Polychromator: A Programmable MEMS Diffraction Grating for Synthetic Spectra," *Solid-State Sensor and Actuator Workshop, Hilton Head Island, South Carolina*, Jun. 4-8, 2000, pp. 89-92.

Boroditsky, "Spontaneous Emission Extraction and Purcell Enhancement from Thin-Film 2-D Photonic Crystals," *Journal of Lightwave Technoloogy*, vol. 17, No. 11, Nov. 1999, pp. 2096-2112.

\* cited by examiner

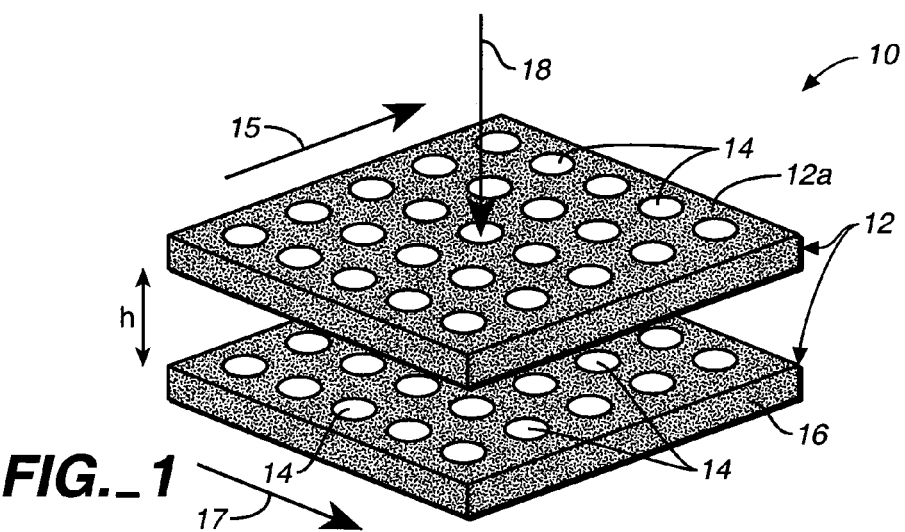
FIG._1
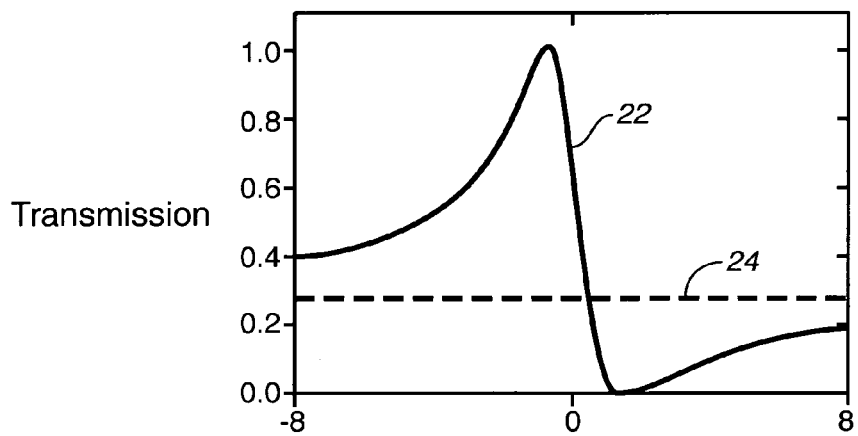
FIG._2a
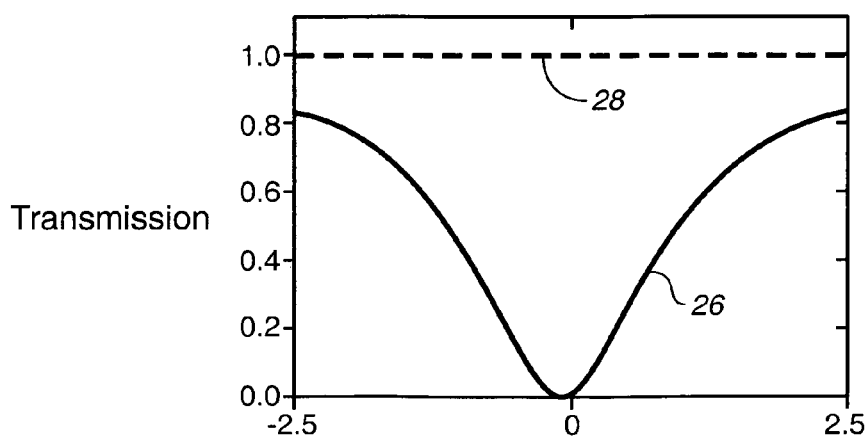
FIG._2b

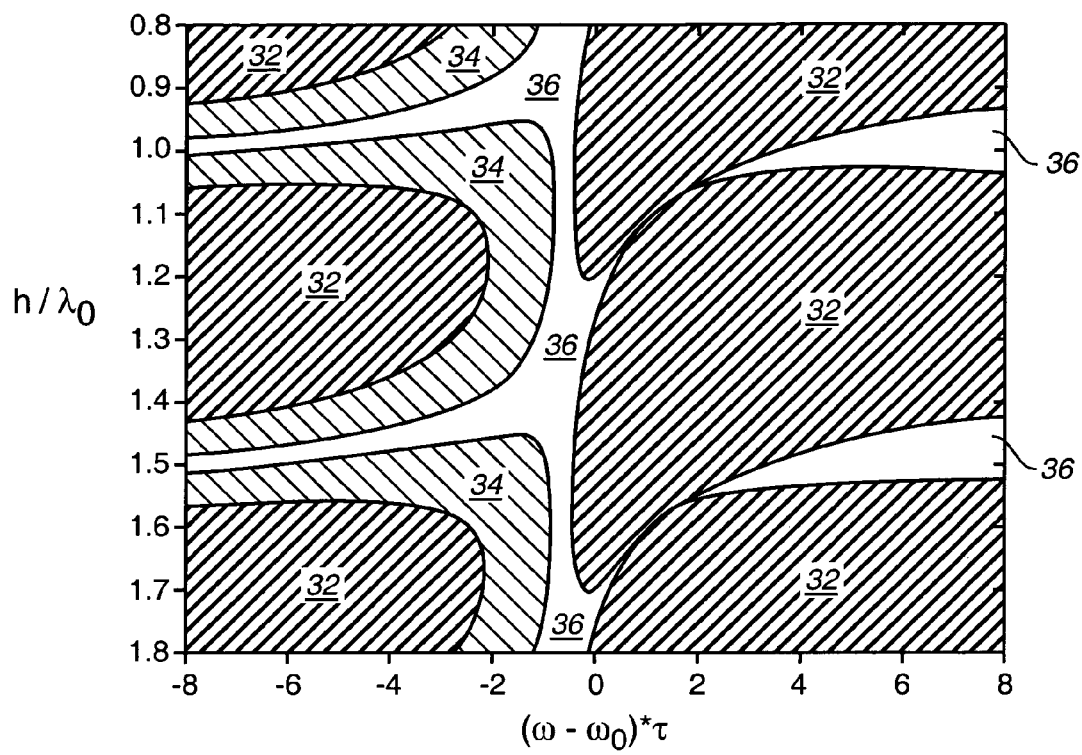
FIG._2c
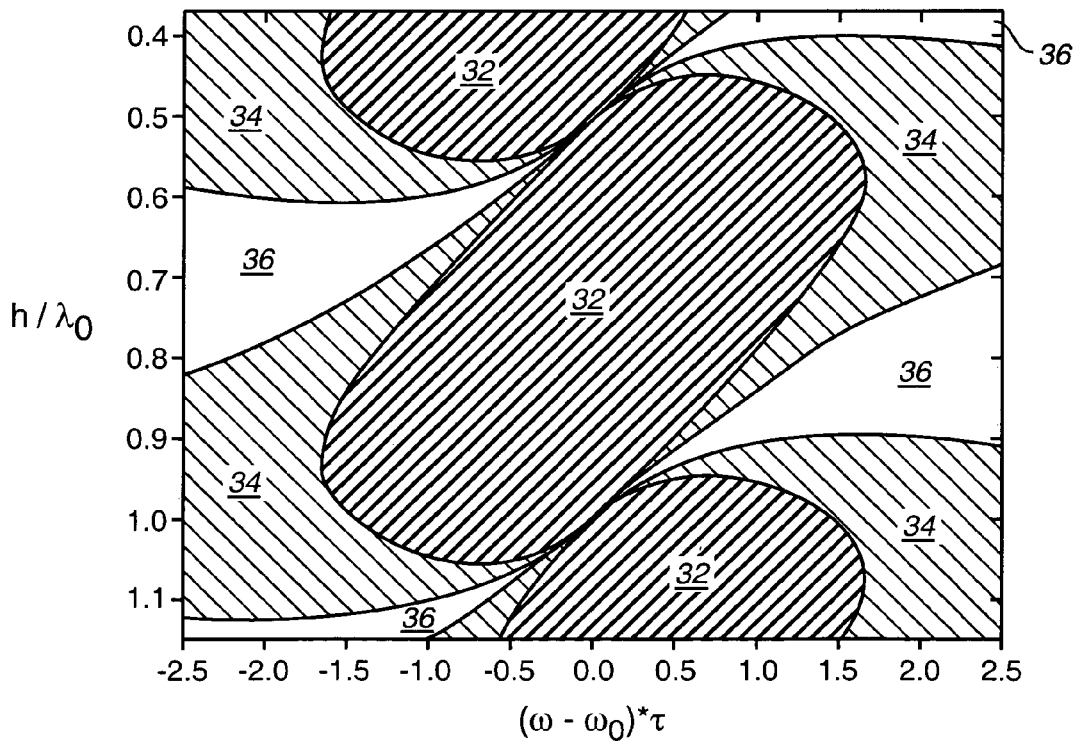
FIG._2d

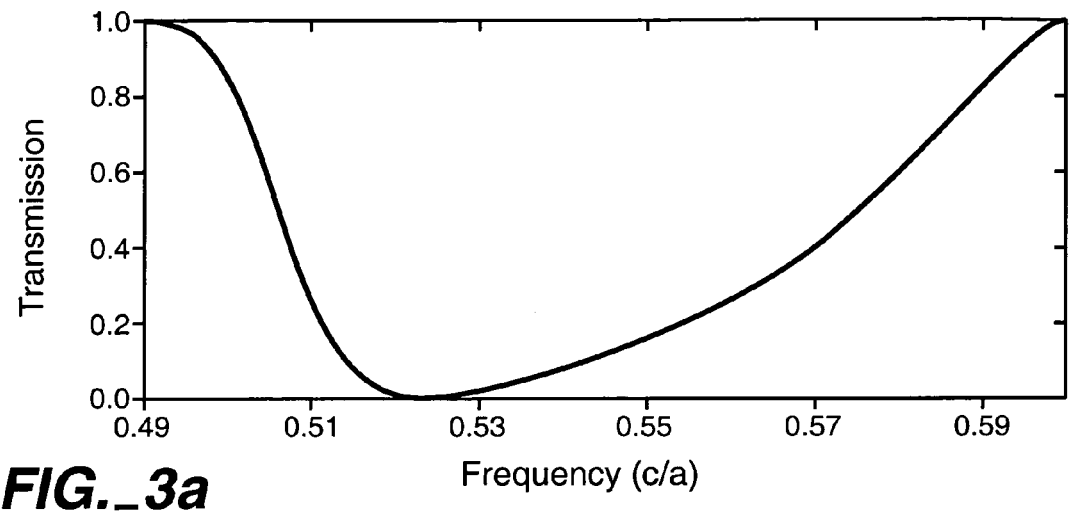
FIG._3a
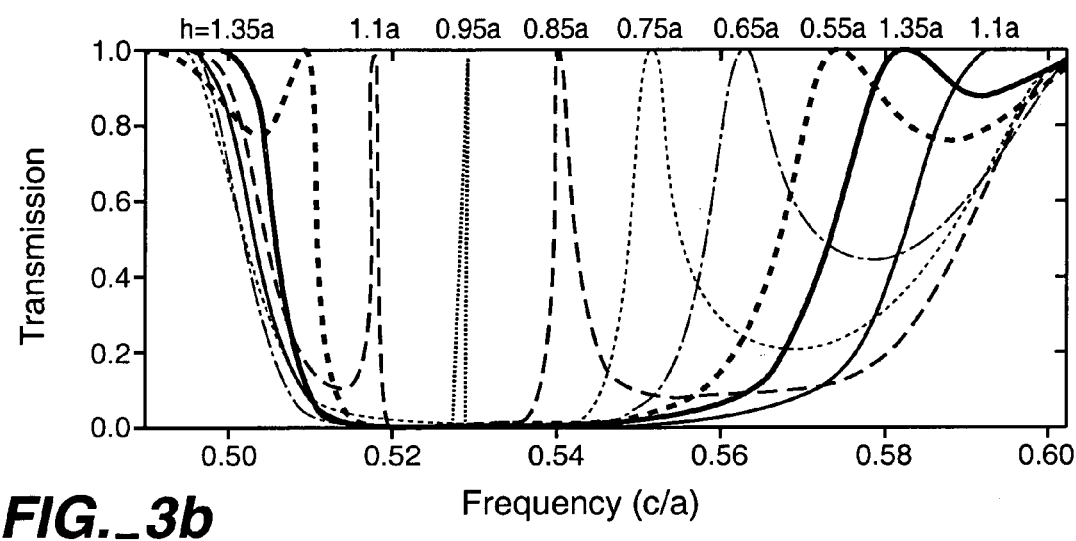
FIG._3b
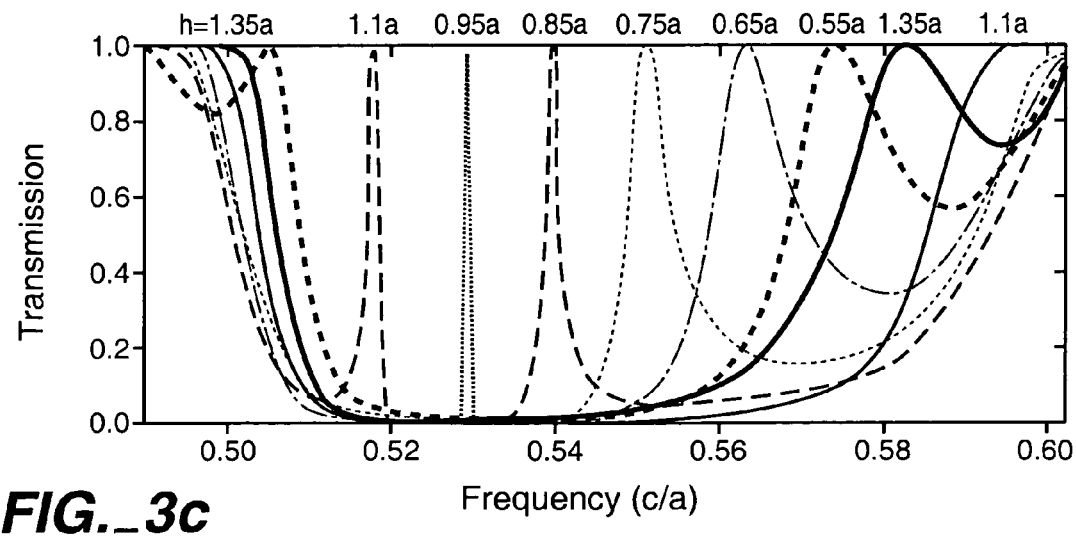
FIG._3c

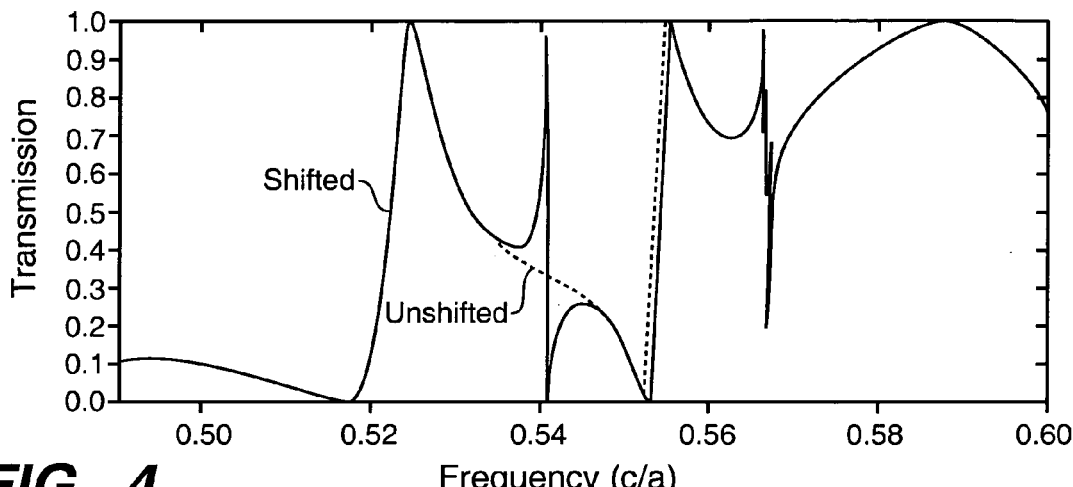
FIG._4
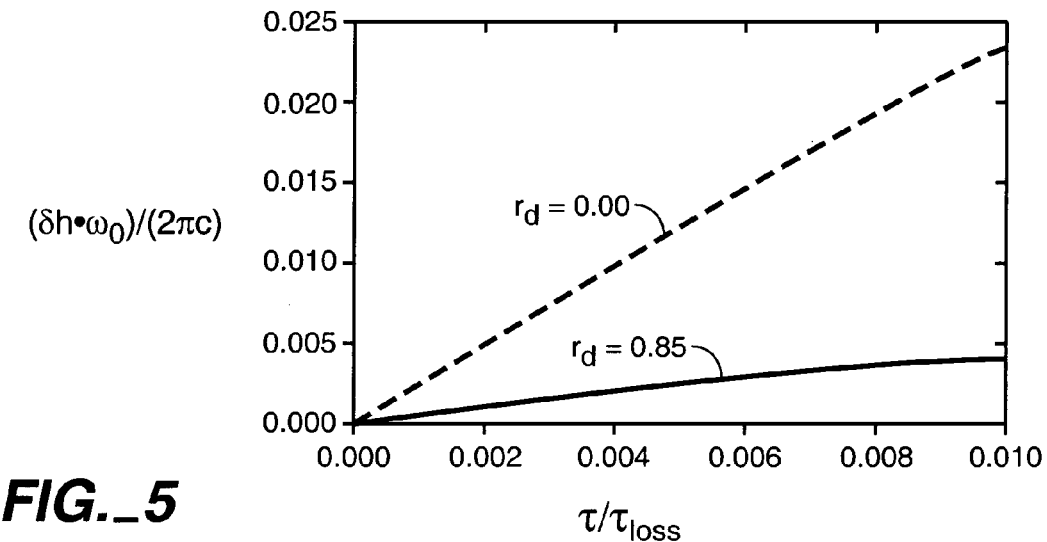
FIG._5
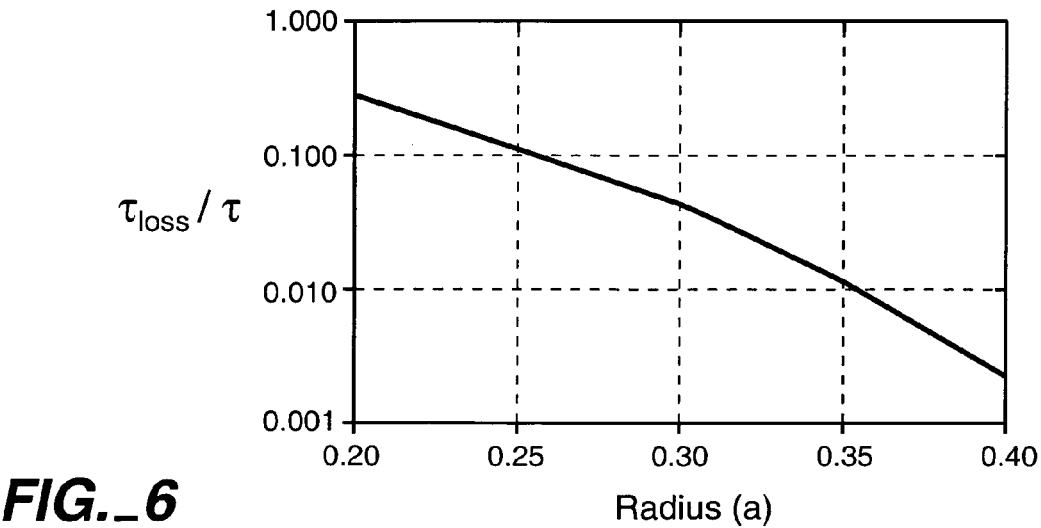
FIG._6

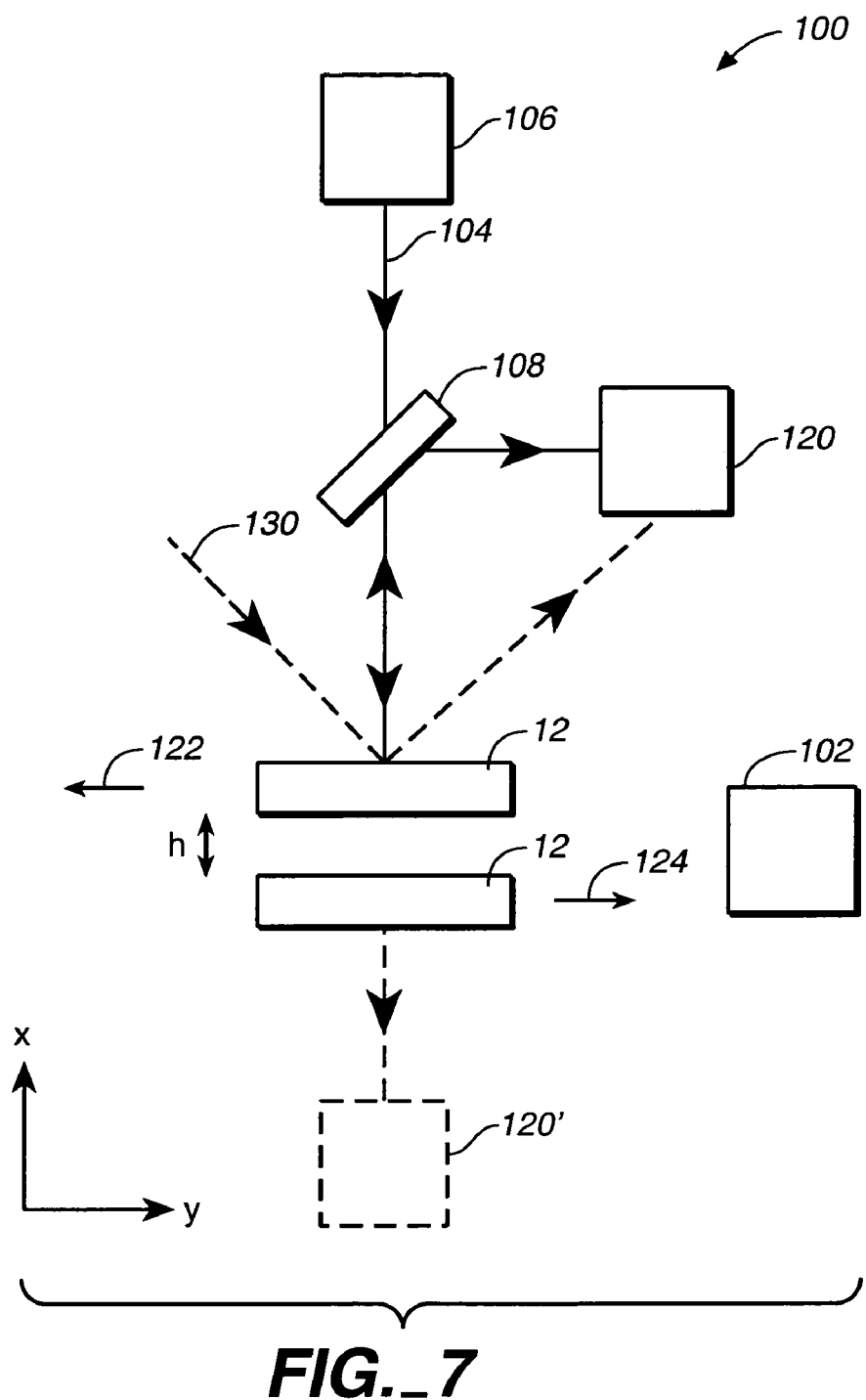
FIG._7

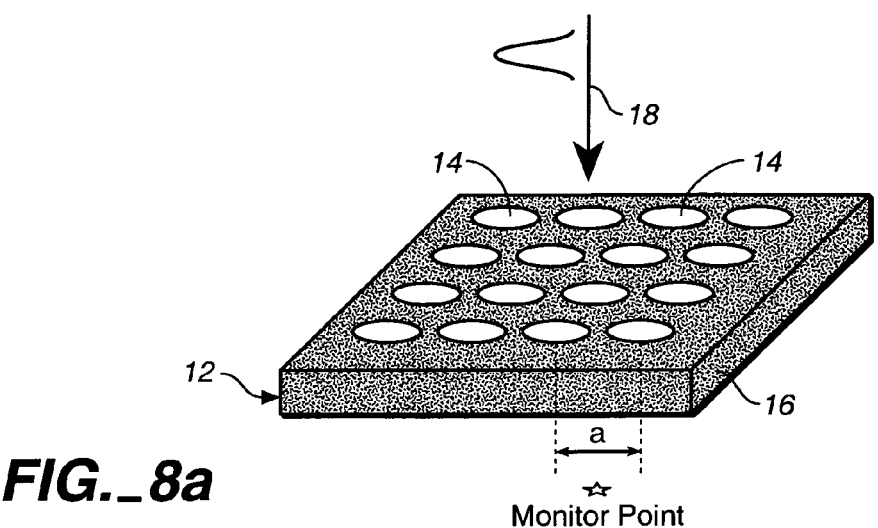
FIG._8a
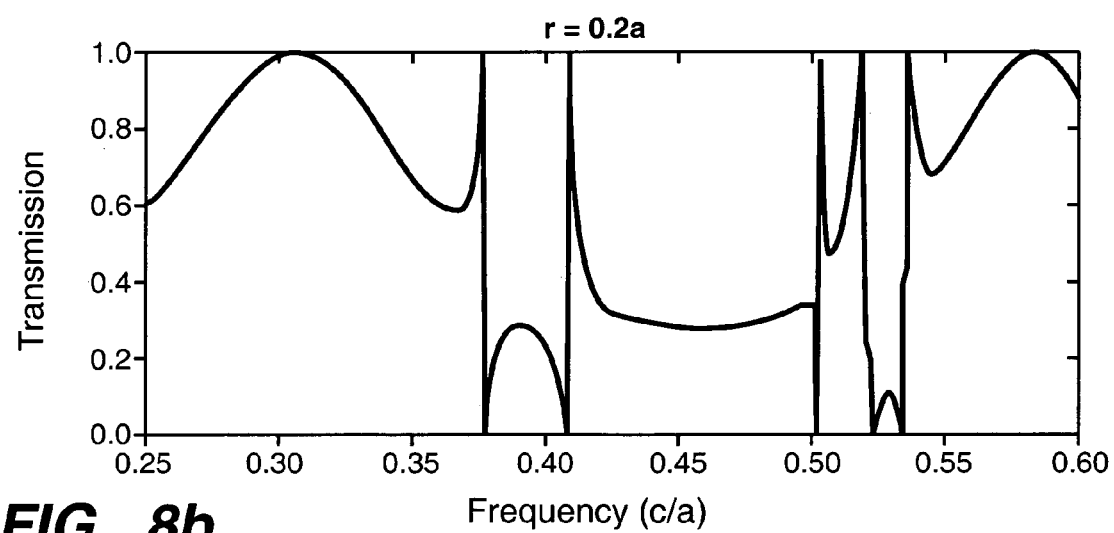
FIG._8b
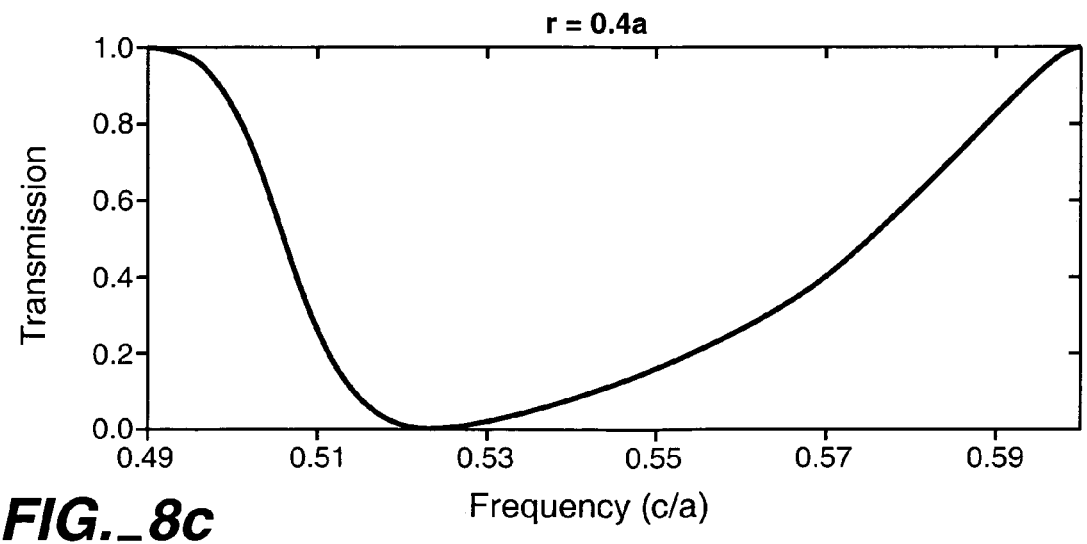
FIG._8c

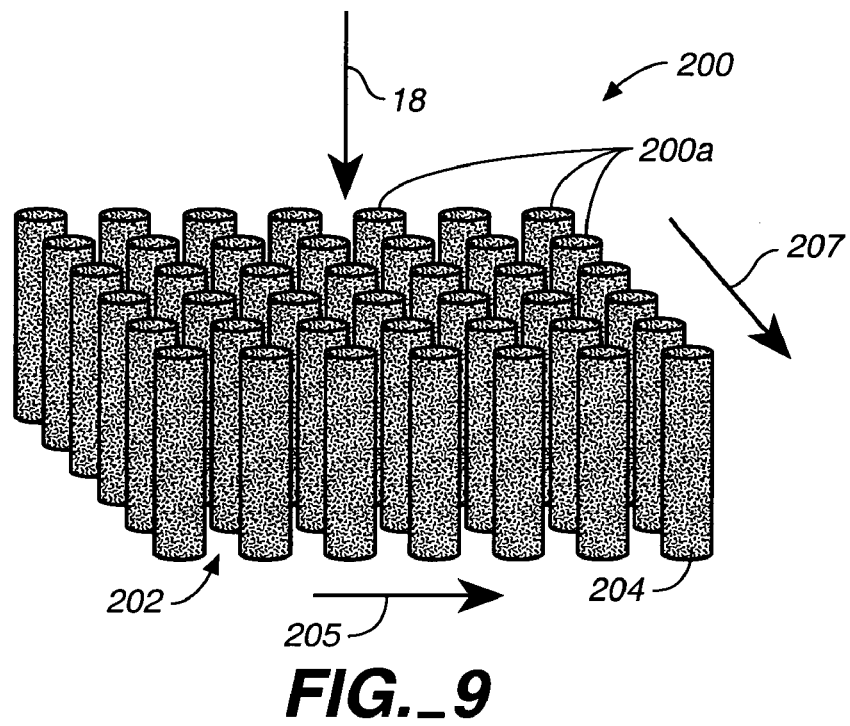
FIG._9
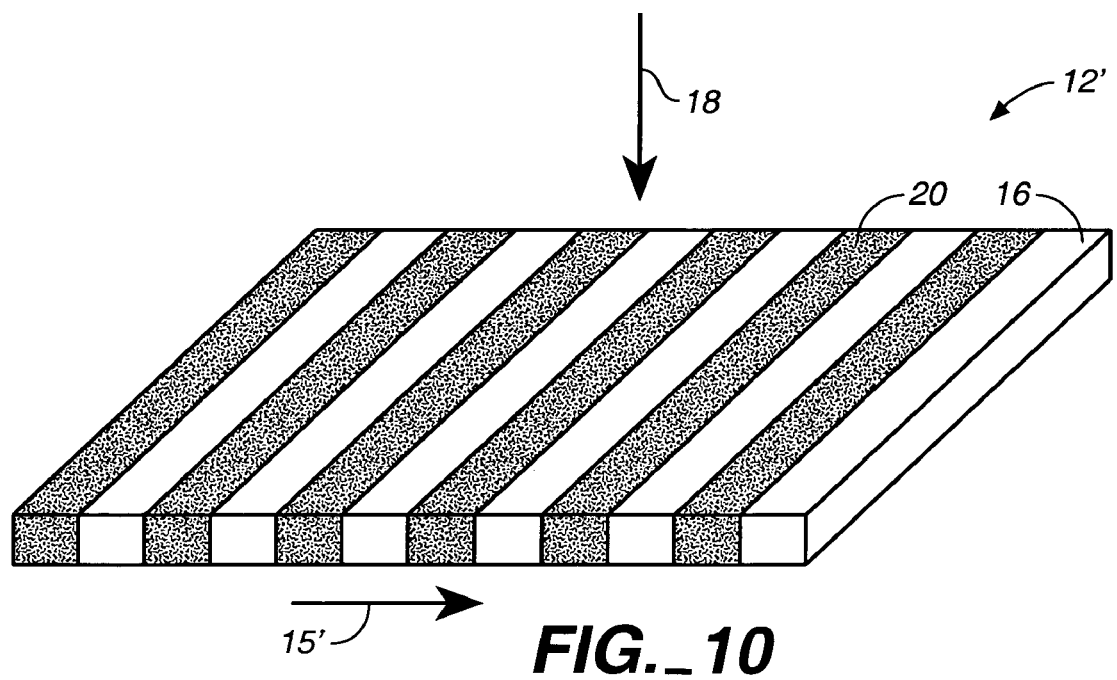
FIG._10

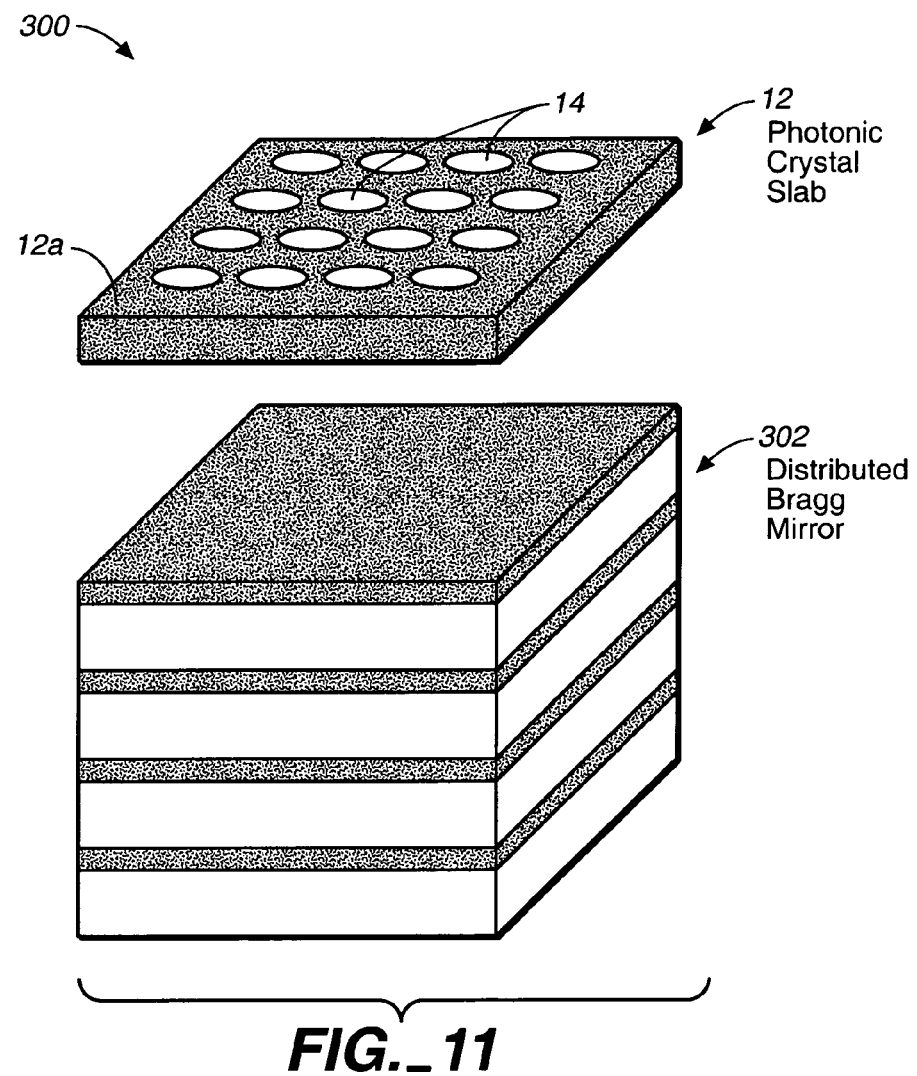
FIG._11

PHOTONIC CRYSTAL REFLECTORS/FILTERS AND DISPLACEMENT SENSING APPLICATIONS

CROSS-REFERENCE TO RELATED APPLICATION

This application claims benefit of U.S. Provisional Patent Application No. 60/417,890 filed Oct. 11, 2002 which application is incorporated herein by reference in its entirety.

BACKGROUND OF THE INVENTION

This invention relates in general to photonic crystals, and in particular to photonic crystal reflectors or filters and their applications, such as in displacement sensing.

Micro-Electrical-Mechanical-Systems (MEMS) technology provides important mechanisms for tuning and switching a wide variety of optical devices such as sensors, filters, modulators, switches, and lasers. See, for example, the following references:

1. "Sub-10 cm3 interferometric accelerometer with nano-g resolution" by N. C. Loh, M. A. Schmidt, S. R. Manalis, J. Microelectromechanical Syst. 11, 181 (2002);
2. "The Polychromator: A programmable MEMS diffraction grating for synthetic spectra", Technical Digest. Solid-State Sensor and Actuator Workshop, pp. 89–92, Hilton Head Island, S.C., USA, 4–8 Jun. 2000, by G. B. Hocker, D. Youngner, E. Deutsch, A. Vol Volpicelli, S. Senturia, M. Butler, M. Sinclair, T. Plowman, A. J. Ricco;
3. "Deformable -grating optical modulator", by O. Solgaard, F. S. A. Sandejas, D. M. Bloom, Opt. Lett. 17, 688 (1992);
4. "Scalable optical cross-connect using micromachined mirrors", by P. M. Hagelin, U. Irishnamoorthy, J. P. Heritage, O. Solgaard, IEEE Photonics Technol. Lett. 12, 882 (2000); and
5. "Tunable VCSEL", by C. J. Chang-Hasnain, IEEE J. Sel. Topics Quantum Electron. 6, 978 (2000).

The success of these microoptomechanical devices relies on the fact that the mechanical motion required for their operation is relatively small; on the order of the operating wavelength for high-contrast devices, and only a small fraction of a wavelength for some sensors and lasers. Reducing the required displacement is of great interest in optical MEMS research, because it decreases, the required actuation force and enables smaller devices with higher response speed. It is therefore desirable to provide an improved system whereby the required actuation force and smaller devices with higher response speeds can be achieved. It is further desirable to provide optical devices with improved optical characteristics that can be used for such systems and for other purposes.

SUMMARY OF THE INVENTION

One aspect of this invention is based on the observation that the wavelength of radiation reflected or transmitted by at least one photonic crystal adjacent to a reflective medium can be controlled by controlling their relative positions, where the at least one photonic crystal comprises a block of dielectric material with one or two dimensional periodic index contrast introduced into the dielectric material. Instead of using a block of dielectric material, a medium comprising an arrangement of dielectric posts with one or two dimensional periodic index contrast may also be used.

In one embodiment, the above aspect of the invention is achieved by controlling a distance between the crystal and the reflective medium, or by controlling a lateral shift or relative rotation between them. Alternatively, in another embodiment, by detecting radiation transmitted or reflected by the crystal and the reflective medium, the relative positions of the two components can be detected whereby a displacement between them can be found. Preferably the at least one photonic crystal comprises a dielectric material defining a one dimensional array of groves, two dimensional array of air holes, or a one or two dimensional array of dielectric posts. In the case of a one or two dimensional array of dielectric posts, such collection of posts comprises a dielectric medium with one or two dimensional periodic index contrast.

Another aspect of the invention is directed to a novel photonic structure that may be advantageously used for applications such as a reflector/filter with controllable characteristics. A substantially periodic one or two dimensional index contrast is inherent in or is introduced into a dielectric material in a manner so that the resulting structure has a scattering strength that causes it to be substantially completely reflective over a range of frequencies. In one embodiment, the periodic index contrast in the structure varies along at least one direction. In such instance, when this structure is used in optical applications, such as optical filtering or reflection, radiation is directed to the structure such that it is directed in a direction that is not along or parallel to such at least one direction. In one implementation of such embodiment, such at least one direction is along a lattice translation vector of the structure. In another embodiment, the structure has a boundary with the ambient environment, and the radiation is directed to the boundary of the structure from the ambient environment.

In one embodiment, the above structure may be accomplished by introducing a periodic index contrast into the dielectric material so that the material has at least one resonant mode at a resonance frequency, and so that electromagnetic radiation incident upon the block is substantially completely reflected over a range of frequencies, where the range is greater than about 1% of the resonance frequency.

In another embodiment, the structure may be accomplished by selecting a dimension related to the index contrast that is introduced. For example, where the periodic index contrast is introduced into a dielectric material by means of introducing an array of holes in the material, the dimensions of the holes are such that this is possible. In yet another embodiment, this may be accomplished by selecting a type of substance that has a selected index into the dielectric material selected to have a different index.

In an embodiment of another aspect of the invention directed to an optical apparatus, two photonic crystals are placed adjacent to one another. Each of said crystals comprises a block of dielectric material with one or two dimensionally periodic index contrast introduced into the dielectric material. The apparatus may be used to transmit or reflect radiation of the desired wavelengths.

In another embodiment of another aspect of the invention directed to an optical apparatus, two photonic crystals are placed, adjacent to one another. Each of said crystals comprises a block of dielectric material with one or two dimensional periodic index contrast introduced into the dielectric material. A device controls a distance between the crystals to adjust the wavelengths of radiation transmitted or reflected by the crystals. The apparatus may be used as a reflector or filter.

In one embodiment of another aspect of the invention is directed to a displacement sensing apparatus. At least one photonic structure is placed adjacent to a reflective medium. The at least one structure comprises a dielectric material with one or two dimensionally periodic index contrast in the material. A detector detects radiation transmitted or reflected by the structure and medium to provide a signal indicative of a distance, or of a lateral shift or relative rotation, between the structure and the medium.

BRIEF DESCRITION OF THE DRAWINGS

FIG. 1 is a schematic view of a displacement-sensitive photonic crystal structure comprising two photonic crystal slabs to illustrate one embodiment of the invention.

FIG. 2(a) is a graphical illustration of the transmission through the slabs of FIG. 1, where the direct transmission coefficient $t_d$ is non-zero.

FIG. 2(b) is a graphical illustration of the transmission through the slabs of FIG. 1, where the direct transmission coefficient $t_d$ is zero.

FIG. 2(c) is a graphical illustration of the transmission coefficients for a two-slab structure as a function of the frequencies of the incident light and the spacing between the slabs, where each slab is assumed to possess an asymmetric response line shape as depicted in FIG. 2(b).

FIG. 2(d) is a graphical illustration of the transmission coefficients for a two-slab structure as a function of the frequencies of the incident light and the spacing between the slabs, where each slab is assumed to possess a symmetric line shape as depicted in FIG. 2(b).

FIG. 3(a) is a graphical plot of transmission spectrum through a single photonic crystal slab for normally incident light, where the crystal structure of the slab comprises a square lattice of air holes of radius 0.4a, where a is the lattice constant, introduced into a dielectric slab with a thickness of 0.55a and a dielectric constant of 12.

FIG. 3(b) is a graphical plot of theoretical transmission spectra for a two-slab structure, where the transmission spectrum of each slab is the same as in FIG. 3(a). The different lines in the plot represent the spectra for spacing h between the slabs of 1.35a, 1.1a, 0.95a, 0.85a, 0.75a, 0.65a, 0.55a, respectively.

FIG. 3(c), is a graphical plot of transmission spectra for the same two-slab structure as in FIG. 3(b), calculated using FDTD simulations.

FIG. 4 is a graphical plot of transmission spectra through two-slab structures, where the transmission spectrum of each slab is the same as in FIG. 3(a), and the spacing between the slabs is 0.1a to illustrate the change in transmission spectrum upon laterally shifting the slabs relative to one another. The brush line curve corresponds to a structure with holes in two slabs aligned to each other vertically. The curve passing through circles corresponds to a structure with the lattice of holes in the top slab shifted by a distance of 0.05a along the (10) direction with respect to the bottom slab.

FIG. 5 is a graphical plot to illustrate sensitivity of the two-slab structure as a function of normalized scattering loss, where sensitivity is defined as the variation of the spacing between the slabs needed in order to switch the transmission coefficients from 20% to 80%.

FIG. 6 is a graphical plot of the normalized scattering loss in disordered photonic crystal slab structures as a function of the radius of air holes in the underlying perfect lattice, where disorder is introduced by varying the radius of air holes randomly around a value for the radius in a perfect crystal, while maintaining approximately the same average dielectric constant. The normalized scattering loss is then determined by calculating the lifetime of the guided resonance using FDTD simulations, in a computational domain consisting of nine unit cells.

FIG. 7 is a schematic view illustrating an apparatus employing two photonic crystals placed adjacent to one another useful for illustrating a number of different applications.

FIG. 8a is a perspective view of a photonic crystal slab where a two-dimensional periodic index contrast has been introduced in the form of a two-dimensional array of air holes.

FIGS. 8(b) and 8(c) illustrate the light transmission characteristics of the photonic crystal slab of FIG. 8(a) at two different hole sizes.

FIG. 9 is a perspective view of a photonic structure comprising an array of rods in a medium to illustrate another embodiment of the invention.

FIG. 10 is a perspective view of a photonic reflector comprising a block of dielectric material with a substantially periodic one-dimensional periodic index contrast introduced into the dielectric material.

FIG. 11 is a schematic view of a displacement-sensitive photonic crystal structure comprising one photonic crystal slab and a dielectric reflector to illustrate one more embodiment of the invention.

For simplicity in description, identical components are labeled by the same numerals in this application.

DETAILED DESCRIPTION OF THE EMBODIMENT

In this application, we introduce a MEMS tunable photonic crystal structure 10 that is extremely compact, and yet can achieve high contrast with nano-scale variation in displacement. FIG. 1 is a schematic view of a displacement-sensitive photonic crystal structure 10 comprising two photonic crystal slabs 12 to illustrate one embodiment of the invention. Each slab is constructed by introducing a periodic array of air holes 14 into a slab of high index dielectric material 16. The arrow 18 represents the direction of the incident radiation or light (used interchangeably herein) on the slabs. The transmission spectrum of the normally incident light is strongly influenced by the spacing h between the slabs.

The structure, as shown in FIG. 1, comprises two photonic crystal slabs 12. Each slab is constructed by introducing a periodic array of air holes 14 into a high-index guiding layer 16. We show that the transmission and reflection coefficients of light through such structures can be extremely sensitive to the nano-scale variations of the spacing h between the slabs. Moreover, by correct design of the photonic crystal structures, high sensitivity can be preserved in spite of significant fabrication-related disorders.

The operation of the proposed structure relies on the guided resonance phenomena in the slabs. The guided resonance is a class of photonic crystal modes that are strongly confined within the slab, and yet can couple into vertical radiations through the phase matching mechanism provided by the periodic index contrast. See, for example, "Observation of leaky slab modes in an air-bridged semiconductor waveguide with a two-dimensional photonic lattice", by M. Kanskar et al, Appl. Phys. Lett. 70, 1438 (1997); "Resonant coupling of near-infrared radiation to photonic band structure waveguides", by V. N. Astratov et al, J. Lightwave Technol. 17, 2050 (1999); and "Analysis of guided resonances in photonic crystal slabs", by S. Fan and J. D. Joannopoulos, Phys. Rev. B, 65, 235112 (2002).

Such resonance has been used in novel photonic crystal light emitting diodes and lasers. See, for example, "Spontaneous emission extraction and Purcell enhancement from thin-film 2D photonic crystals", by M. Boroditskky, R. Vrijen, T. F. Krauss, R. Coccioli, R. Bhat, and E. Yablonovitch, J. Lightwave Technol. 17, 2096 (1999); "Enhanced coupling to vertical radiation using a two-dimensional photonic crystal in a semiconductor light-emitting diode", by A. Erchak, D. J. Ripin, S. Fan, P. Rakich, J. D. Joannopoulos, E. P. Ippen, G. S. Petrich and L. A. Kolodziejski, Appl. Phys. Lett. 78, 563 (2001); "Over 30 fold enhancement of light extraction from free-standing photonic crystal slabs with InGaAs quantum dots at low temperature", by H. Y. Ryu, Y. H. Lee, R. L. Sellin, and D. Bimberg, Appl. Phys. Lett. 79, 3573–5 (2001); "Laser action from twodimensional distributed feedback in photonic crystals", by M. Meier, A. Mekis, A. Dodabalapur, A. A. Timko, R. E. Slusher and J. D. Joannopoulos, Appl. Phys. Lett. 74, 7 (1999); "Polarization mode control of two-dimensional photonic crystal laser by unit cell structure design", by S. Noda, M. Yokoyama, M. Imada, A. Chutinan, and M. Mochizuki, Science, 293, 1123 (2000).

In transmission or reflection spectra, a guided resonance typically manifests itself as a Fano line shape that is superimposed, upon a smoothly varying background. For more information, please see "Observation of leaky slab modes in an air-bridged semiconductor waveguide with a two-dimensional photonic lattice", by M. Kanskar et al, Appl. Phys. Lett. 70, 1438 (1997); "Resonant coupling of near-infrared radiation to photonic band structure waveguides", by V. N. Astratov et al, J. Lightwave Technol. 17, 2050 (1999); and "Analysis of guided resonances in photonic crystal slabs", by S. Fan and J. D. Joannopoulos, Phys. Rev. B, 65, 235112 (2002).

Using temporal coupled-mode theory, the scattering matrix for a single guided resonance in general can be written in the following form $$S = \begin{bmatrix} r & t \\ t & r \end{bmatrix} = \begin{bmatrix} r_d & t_d \\ t_d & r_d \end{bmatrix} + \frac{1/\tau}{j(\omega - \omega_o) + 1/\tau} \begin{bmatrix} -(r_d \pm t_d) & \mp(r_d \pm t_d) \\ \mp(r_d \pm t_d) & -(r_d \pm t_d) \end{bmatrix} \quad (1)$$

where $\omega_0$ and $\tau$ are the center frequency and the lifetime of the resonance, r and t are the transmission and reflection coefficients of the resonator system, and $r_d$ and $t_d$ are the background reflection and transmission coefficients of a corresponding uniform slab at the resonant frequency $\omega_0$. The plus/minus signs correspond to resonant modes with even and odd symmetry with respect to the mirror plane parallel to the surface of the slab. (See for example, S. Fan, W. Suh and J. D. Joannpoulos, "Temporal coupled mode theory for Fano resonance in optical resonators", Journal of Optical Society of America A(20, 3, 2003). The right hand side of equation(1) describes the interference of two pathways that contribute to the transmission and reflection processes. The first term represents a direct pathway, in which incident light passes through the slab without exciting the guided resonance. The second term represents a resonant pathway, in which the incident light excites the guided resonance, followed by a decay of the power in the guided resonance.

Depending on the magnitude of $r_d$ and $t_d$, Equation (1) gives rise to two distinct line shapes. FIG. 2(a) is a graphical illustration of the transmission through the slabs of FIG. 1, where the direct transmission coefficient $t_d$ is smaller than one, and the direct reflection coefficient $r_d$ is non-zero. The solid line 22 represents the intensity transmission spectrum as determined from equation (1), for a guided resonance in a single slab structure. The line shape is asymmetric around the resonance frequency $\omega_0$ since the direct reflection coefficient $r_d$ is non-zero and the direct transmission coefficient $t_d$ is less than 1 and represented by the dashed line 24 in the figure. When $r_d$ is non-zero, the response function 22 assumes a Fano asymmetric line shape, where the reflectivity varies from 0% to 100% over the width of the resonance (FIG. 2(a)). The background transmission 24 is shown in dotted line. In the range of frequencies shown in FIG. 2(a), the background transmission $t_d$ 24 is approximately constant.

FIG. 2(b) is a graphical illustration of the transmission through the slabs of FIG. 1, where the direct reflection coefficient rd is zero, the direct transmission td is one, and thus the transmission spectrum 26 (solid line) exhibits a symmetric line shape around the resonance frequency. The line shape 26 is a Lorentzian that is symmetric with respect to the resonance frequency (FIG. 2(b)), where the background transmission 28 is shown in dotted line. See "New principle for optical filters", by R. Magnusson and S. S. Wang, Appl. Phys. Lett. 61, 1022 (1992). The background transmission and reflection coefficients rd and td are primarily determined by the thickness and the dielectric constant of the slab, while the frequencies of the guided resonance is strongly influenced by the periodicity of the crystal lattice and the size of the air holes. (See "Analysis of guided resonances in photonic crystal slabs", S. Fan and J. D. Joannopoulos, Phys. Rev. B, 65, 235112 (2002). Hence, we can design crystal structures that possess either type of line shape.

Of particular relevance for our purpose here is the presence of strong reflectivity in the vicinity of $\omega_0$ for both types of resonance. Exploiting this effect, we can construct structures that are highly sensitive to mechanical displacements by using the photonic crystal slabs as mirrors to form an optical cavity. In general, the transmission coefficient through a cavity structure can be expressed as (see Saleh and Teich, "Fundamentals of Photonics", Wiley, 1991):

$$|t_{total}|^2 = \frac{(1 - |r|^2)^2}{(1 - |r|^2)^2 + 4|r|^2 \cos^2(\arg(t) - \phi)}, \quad (2)$$

where t and r are the transmission and reflection coefficients of the mirrors, and $\phi = (\omega/c)*h$ is the phase shift that the wave acquires as it propagates through the cavity. The phase shift contains the information of the distance between two slabs. Using Equations (1) and (2), and starting from the transmission spectra in FIGS. 2(a) and (b), we theoretically calculate the transmission coefficients for the two-slab structures, and plot them in FIGS. 2(c) and 2(d) as a function of both frequency $\omega$ and the spacing h between the slabs, where $\lambda_0$ is the center wavelength of the resonance.

FIG. 2(c) is a graphical illustration of the transmission coefficients for a two-slab structure as a function of the frequencies of the incident light and the spacing between the slabs, where each slab is assumed to possess an asymmetric response line shape as depicted in FIG. 2(a). The horizontal axes represent the frequency shift from the resonance normalized by the inverse lifetime of the resonance. The vertical axes represent the spacing between the two slabs normalized by the resonance wavelength of a single slab. FIG. 2(d) is a graphical illustration of the transmission coefficients for a two-slab structure as a function of the frequencies of the incident light and the spacing between the slabs, where each slab is assumed to possess a symmetric line shape as depicted in FIG. 2(b).

The shaded areas 32 in FIGS. 2(c) and 2(d) indicate values of h and ω where transmission is substantially zero, which means substantially all radiation having such values of ω would be reflected if the distance h between the slabs 12 is within the values in these areas. The unshaded areas 36 in FIGS. 2(c) and 2(d) indicate values of h and ω where transmission is substantially 100%, which means substantially all radiation within such frequencies would be transmitted if the distance h between the slabs 12 is within the values in these areas. The shaded areas 34 in FIGS. 2(c) and 2(d) between the shaded areas 32 and unshaded areas 36 indicate values of h and ω where transmission is substantially reduced, which means most of the radiation within such frequencies would be reflected if the distance h between the slabs 12 is within the values in these areas.

The two-slab structure exhibits a transmission peak in the vicinity of $\omega_0$ with the maximal transmission coefficients approaching 100%. Thus, in reference to FIG. 2(c), at the frequency $\omega_0$, the transmission peak appears in the vertical area 36 across a broad range of values of h. But within a range of frequencies away from the value $\omega_0$, however, this appears in a very small area where $h/\lambda_0$ has the values of about 1.5 and 1. In reference to FIG. 2(d), again across a range of frequencies, including those at or near the resonance frequency $\omega_0$, however, this appears in a very small area where $h/\lambda_0$ has the values of about 0.5 and 1. Thus the frequency $\omega_p$ and the width $\gamma_p$ of the transmission peak vary with the spacing h between the slabs. We note in FIGS. 2(c) and 2(d) the existence of specific distances between the slabs, where the width $\gamma_p$ of transmission peak vanishes and yet the height of the transmission peak remains at 100%. At these distances, $\omega_p$ coincides with the frequency at which the transmission is zero for the single slab. The reflectivity from a single slab then approaches 100% and the width of the transmission peak for the two slab structures becomes infinitesimal. The sensitivity of the transmission to the variation of the spacing between the slabs therefore approaches infinity at these distances. At other values of the slab spacing, the width of the transmission peak increases. By changing the distance between the slabs we can therefore reconfigure the sensitivity of the structure, and control the wavelength of radiation reflected by the structure 10 across a range of frequencies. In other words, a small change in the distance h can cause a huge change in reflectivity of device 10 across a range of frequencies.

The transmission through an optical cavity is sensitive to the variation of the distance between the mirrors when the reflectivity of both mirrors approach unity. At optical wavelengths, one way to construct highly reflecting mirrors is to use transparent dielectric materials since metals are inherently glossy. While it is possible to use multi-layer dielectric mirrors, constructing two such mirrors in a MEMS-tunable cavity configuration remains a challenge. The novelty and the significance of our approach lie in its simplicity: we exploit the fact that high reflectivity can be achieved in a single dielectric layer by introducing in-plane periodic index contrast. This structure should therefore greatly simplify the fabrication complexity in the MEMS structure.

To check the validity of this analytical approach, we compare the theory, as represented by Equations (1) and (2), to finite-difference time-domain simulations (FDTD). For more information on FDTD, please see "The Finite-Difference Time-Domain Methods for Electromagnetics," by K. S. Kunz and R. J. Luebbers (CRC Press, Boca Raton, 1993); and "Computational Electrodynamics: The Finite-Difference Time-Domain Methods," by A. Taflove and S. Hagness (Artech House, Boston, 2000). The details of the numerical procedures are the same as in "Analysis of guided resonances in photonic crytal slabs", by S. Fan and J. D. Joannopoulos, *Phys. Rev. B*, 65, 235112 (2002): We use a single crystal (as shown in FIG. 8a) with a square lattice of air holes introduced into a high dielectric slab. The holes have a radius of 0.4a, where a is the lattice constant. The slab has a dielectric constant of 12, and the thickness of each slab is 0.55a. The transmission spectrum for a single photonic crystal slab is represented by the empty circles in FIG. 3(a), and is fitted to the analytic theory, which is calculated using Equation (1) and is represented by the solid line in FIG. 3(a). When the size of the air holes is large, the guided resonance is not a narrow band phenomenon. Rather, strong reflection can occur over a fairly wide range of frequencies.

FIG. 3(b) is a graphical plot of theoretic transmission spectra for a two-slab structure, calculated using equations (1) and (2), where the transmission spectrum of each slab is the same as in FIG. 3(a). The different lines in the plot represent the spectra for spacing h between the slabs of 1.35a, 1.1a, 0.95a, 0.85a, 0.75a, 0.65a, 0.55a, respectively. The parameters of the theory are taken from the theoretical fit as shown in FIG. 3(a). The theoretical transmission calculated using Equations (1) and (2) for different values of displacement in FIG. 3(b) may be compared with the FDTD simulations. FIG. 3(c) is a graphical plot of transmission spectra for the same two-slab structure as in FIG. 3(b), calculated using FDTD simulations. The spectra show excellent agreements. (The scattering-matrix parameters used in the analytic theory are determined directly from the simulated transmission spectrum for a single slab.) Notice that effect of having two slabs is indeed the introduction of a sharp transmission peak in the frequency range where a single slab shows near complete reflection. Moreover, depending on the spacing between the slabs, the width of the transmission peak can be arbitrarily small, with a corresponding arbitrarily large sensitivity.

The excellent agreement between the theory and the simulations indicates that when h>0.5a, the coupling between the slabs is primarily due to propagating waves. In this far-field coupling regime, the transmission spectra are independent of the lateral alignments of the two slabs. For smaller spacing, evanescent tunneling and near-field coupling between the slabs also become important and equation (2) needs to be substantially modified. The "near-field" regime corresponds to the situation when the electromagnetic modal profile of the guided resonance of the two slabs significantly overlap in space. In such a case, the electromagnetic field can tunnel from one resonance to the other, in addition to the coupling through a far-field propagation process.

FIG. 4 is a graphical plot of transmission spectra through two-slab structures, where the transmission spectrum of each slab is the same as in FIG. 3(a), and the spacing between the slabs is 0.1a to illustrate the change in transmission spectrum upon laterally shifting the slabs relative to one another in the near-field regime. The curve formed by a string of "x" corresponds to a structure with holes in two slabs aligned to each other vertically. The curve passing through circles corresponds to a structure with the lattice of holes in the top slab shifted by a distance of 0.05a along the (10) direction with respect to the bottom slab.

As indicated in FIG. 3(a), in the far-field coupling regime the two slabs support a resonance around w=0.53 c/a. The near-field coupling between the slabs illustrated in FIG. 4 splits the resonance and creates two resonant lines. In addition, a lateral shift of 0.05a along the (10) direction between the two slabs 12 in FIG. 1 breaks the four-fold rotational symmetry of the structure, and introduces extra resonances into the transmission spectra. Such resonances correspond to the singly degenerate states that are uncoupled ("Analysis of guided resonances in photonic crytal slabs", by S. Fan and J. D. Joannopoulos, Phys. Rev. B, 65, 235112 (2002); "Dispersion relations and optical transmission of a hexagonal photonic crystal", T. Ochiai and K. Sakoda, Phys. Rev. B 63, 125107 (2001)) when the two slabs are aligned. The calculation thus demonstrates that the near-field coupling regime provides the additional possibility of lateral displacement sensing.

In practice the achievable sensitivity is limited by optical losses especially from absorption and scattering by fabrication-related disorders. For our two-slab structure, the highest achievable sensitivity is directly related to the maximal reflectivity achievable in a single slab. For a single slab, the presence of the disorders reduces the reflectivity by affecting both the direct and the resonance terms in;the scattering matrix represented in Equation (1). However, since strong reflection can only be achieved in the presence of the resonance, our main interest here is to elucidate how optical losses affect the optical resonance. We therefore construct the following simple model, where we incorporate the effect of losses on the resonance in a standard way (H. A. Haus, Waves and Fields in Optoelectronics, (Prentice Hall, Englewood Cliffs, 1984)) by introducing an extra decay factor $1/\tau_{loss}$ into the resonance term in Equation (1):

$$S = \begin{bmatrix} r & t \\ t & r \end{bmatrix} = \begin{bmatrix} r_d & t_d \\ t_d & r_d \end{bmatrix} + \frac{1/\tau}{j(\omega - \omega_o) + 1/\tau + 1/\tau_{loss}} \begin{bmatrix} -(r_d \pm t_d) & \mp(r_d \pm t_d) \\ \mp(r_d \pm t_d) & -(r_d \pm t_d) \end{bmatrix}. \quad (3)$$

The sensitivity of the two-slab structure can then be estimated from the transmission spectrum calculated from Equations (2) and (3). Defining the sensitivity as the minimum displacement δh needed to switch the transmission coefficients from 20% to 80%, we plot δh in FIG. 5 as a function of $\tau/\tau_{loss}$. In the presence of loss, the sensitivity of the structure becomes finite since the maximum reflectivity from a single slab no longer goes to unity. FIG. 5 is a graphical plot to illustrate sensitivity of the two-slab structure as a function of normalized scattering loss $\tau/\tau_{loss}$. The sensitivity is defined as the variation of the spacing between the slabs needed in order to switch the transmission coefficients from 20% to 80%. The solid and the dashed lines correspond to the case of where the background reflection coefficients rd are 0.85 and 0, respectively. Notice the improvement of sensitivity when $r_d$ is large.

The simple model, as represented in Equation (3); immediately suggests two ways to design structures that are robust against disorders. First of all, it is beneficial to increase the background reflectivity $r_d$, since doing so enhances the total reflectivity of the structure. This can be accomplished by choosing the appropriate thickness of the slab. In FIG. 5, we compare the sensitivity for the case where $r_d(\omega_0)$=0 and for the case where $r_d(\omega_0)$ is maximized at 0.85. (This value is appropriate for a silicon photonic crystal slab suspended in air. "Analysis of guided resonances in photonic crytal slabs", by S. Fan and J. D. Joannopoulos, Phys. Rev. B, 65, 235112 (2002).) For the same scattering loss, the structure with a maximal background reflectivity is at least five times more sensitive.

We also note that the effect of optical loss on the resonance enters as a function of $\tau/\tau_{loss}$. For a given scattering lifetime $\tau_{loss}$, we can therefore reduce its effect by decreasing the lifetime τ of the guided resonance in the underlying perfectly periodic lattice. Thus, it is beneficial to use structures with a strong in-plane scattering strength, such as structures with large air holes. We confirm this numerically by employing a super-cell approximation to model disorders in the FDTD simulations. The computational domain consists of nine unit cells of the crystal. The effect of disorder is simulated by allowing the radii of holes in each unit cell to fluctuate by as much as 5% of the lattice constant while keeping the average dielectric approximately constant. The normalized scattering loss $\tau/\tau_{loss}$ is then determined by comparing the lifetimes of the guided resonance between the disordered and the perfect structures, and is shown in FIG. 6. Increasing the radius of the holes indeed reduces dramatically the effect of the scattering losses by several orders of magnitude. Combining FIGS. 5 and 6, we estimate that for a crystal structure with the radius of 0.4a, the achievable sensitivity can be as small as about 1% of the operating wavelength.

We also note that the effects reported are well suited for implementation in MEMS technology. The guided resonance phenomenon provides a means for tailoring the reflectivity of thin slabs of Silicon or other semiconductors to fit the requirements of specific optical devices. This is important in MEMS structure where the mass, size and internal material stresses of multi-layer dielectric stacks often create significant difficulties. Moreover, the high sensitivity to displacement of the two-slab photonic crystal structure will enable MEMS devices with higher speed and lower actuation voltages. The guided resonance phenomena in photonic crystal structures with strong index contrast thus provide a new tool for optical engineering on the nano-scale.

FIG. 7 is a schematic view illustrating an apparatus employing two photonic crystals placed adjacent to one another useful for illustrating a number of different applications. As shown in FIG. 7, the two photonic crystal slabs 12 are placed adjacent to one another and are spaced apart by distance h. The spacing h can be altered, by means of a motor 102 in a manner known to those skilled in the art. Radiation beam 104 is provided by a source 106. Beam 104 is passed through a beam splitter 108 to the two slabs 12. Radiation reflected by the slabs is reflected by beam splitter 108 towards the detector 120. Detector 120 therefore detects the amount of radiation that is reflected by the slabs 12.

From the above description, it is evident that the transmission of radiation by the slabs is a very sensitive function of the spacing h. Therefore, by altering the spacing h by only a small amount by means of motor 102, the wavelength of radiation transmitted and reflected by the slabs 12 can be controlled effectively. As illustrated above in FIGS. 2c and 2d, the transmission can change from almost 0% to almost 100% by a slight change in the spacing h.

Conversely, the apparatus 100, or portions thereof, can also be used as a displacement sensor. By monitoring the radiation that is reflected by the slabs toward detector 120, any change in the spacing h between the two slabs can be monitored to detect any displacements between the two slabs. Therefore, if the two slabs are attached to two other components (not shown), movement between the two components causing a change in spacing h between the two slabs 12 can be detected by means of apparatus 100. It is noted that in this particular application, motor 102 is not needed.

From FIG. 4 and the accompanying description above, it is noted that a lateral shift between the two slabs 12 along the Y direction along arrows 122 and 124, for example, may cause additional transmission and reflection peaks to occur. Relative rotation between the two slabs can be detected in a similar fashion. Therefore, again by detecting the wavelength of radiation that is reflected by the two slabs by means of detector 120, lateral shifts of slabs 12 relative to each other along the Y axis, or relative rotation, can be detected.

Alternatively, the wavelength of radiation that is reflected and transmitted by the slabs 12 can be controlled by causing lateral shift of the two slabs relative to each other along the Y axis, such as by means of motor 102.

While the radiation beam 104 is shown to be incident on slabs 12 in a direction substantially normal to the surface of the slabs (as also shown in the other embodiments in this application), this is not required, and the radiation beam may be incident on the slabs at an oblique angle, such as along path 130 shown in dotted line, and the reflection of the oblique beam may be detected by detector 120, so that the beam splitter 108 is not necessary. Instead of detecting the radiation that is reflected by the slabs 12, alternatively, the detector may be placed on the other side of the slabs 12 from source 106 to detect the radiation that is transmitted by the slabs, at a position 120' shown in dotted lines in FIG. 7. As shown in FIG. 7, in a lateral shift, one of the two slabs moves along arrow 122 in the negative Y direction, and the other slab is moved along arrow 124 in the positive Y direction.

The building block of the devices described above is a photonic crystal with one- or two-dimensional periodic index contrast introduced into the crystal. The wavelength of radiation that is transmitted and reflected by the crystal is controlled by characteristics of the index contrast that has been so introduced. Such characteristics have a direct bearing on the scattering strength of the crystal. Where periodic index contrast is introduced by means of introducing holes into a dielectric material, the scattering strength is related to both the index contrast between the material inside the dielectric slab and the material inside the holes, and the size of the holes. An increased scattering strength can be accomplished by either increasing the index contrast between the material inside the dielectric slab and the material inside the holes, or by increasing the sizes of the holes, or both.

FIG. 8a is a perspective view of a photonic crystal slab where a two-dimensional periodic index contrast has been introduced in the form of a two-dimensional array of holes 14. The scattering strength of slab 12 is a function of the size of the holes 14 as well as the index contrast between the dielectric material 16 and the substance that can be introduced into holes 14. Thus, in the embodiment of FIG. 8a, this contrast is the contrast between air and the dielectric material 16. Thus, by selecting holes 14 of the appropriate size, the indices of refraction of dielectric material 16 and of any substance (such as air) that is in the holes 14, the scattering strength of slab 12 can be selected to be of the appropriate value. In one embodiment where the holes 14 are filled with air, it is found that if the diameters of holes 14 are at least 0.2a, where a is the lattice, constant (the shortest distance between each hole and an adjacent hole), the slab reflects substantially all radiation within a significant range of frequencies. The transmission characteristics of slab 12 of FIG. 8a are shown in FIGS. 8(b) and 8(c) at two different hole sizes. As will be evident from FIGS. 8(b) and 8(c), increasing the size of the holes from 0.2a to 0.4a has a dramatic effect in changing the transmission characteristics of slab 12. Such effect can therefore be used for controlling the wavelength range in which the slab transmits and reflects radiation.

Instead of, or in addition to, choosing the size of the holes, the transmission characteristics of slab 12 can also be changed by choosing a suitable substance or material that is to be introduced into the holes 14. While in some embodiments a substantially periodic index contrast is preferably introduced into the slab to cause the effects described above, it will be understood that this is not required, and a non-periodic index contrast introduced into the slab may cause the slab to have the same characteristics described above. Such and other variations are within the scope of the invention.

In one embodiment, a periodic index contrast is introduced into the dielectric material so that the material has at least one resonant mode at a resonance frequency, and so that electromagnetic radiation incident upon the block is substantially completely reflected over a range of frequencies, where the range is greater than about 1% of the resonance frequency.

FIG. 9, is a perspective view of a photonic structure 200 comprising an array of rods 204 in a medium 202 to illustrate another embodiment of the invention. As shown in FIG. 9, where the index contrast is introduced into the medium 202 by inserting an array of rods 204. Preferably the array 204 is periodic. While array 204 is shown as two-dimensional, it can also be a one dimensional array. Instead of forming the structures 12 and 200 of FIGS. 1 and 9 by forming holes or inserting rods, these structures can be formed by other methods as well. Substantially all of the advantages described above for structure 12 can be obtained using the structure 200.

It is noted that each of the structures 12 and 200 comprises a medium with a boundary that separates the medium from the ambient environment. In FIG. 1, structure 12 has boundary 12a, which may simply a surface of the slab 12. This boundary separates the slab from the ambient, which may be air. The radiation is therefore directed to the boundary of the slab from the ambient environment. Similarly, in FIG. 9, structure 200 has boundary 200a, which may be a surface formed by the upper ends of the posts 204; this surface may or may not be planar. This boundary separates the structure 200 from the ambient, which may be air. The radiation is therefore directed to the boundary of the slab from the ambient environment.

FIG. 10 is a perspective view of a photonic reflector comprising a block of dielectric material with a substantially periodic one-dimensional periodic index contrast introduced into the dielectric material. As shown in FIG. 10, slab 12' comprises strips of one material 16 that are sandwiched between another material 20. By selecting the relative widths of the two materials 16 and 20 and by selecting the materials having the appropriate indices of refraction for the two strips 16 and 20, the transmission characteristics of slab 12' can be similarly controlled as in the manner of slab 12 described above. As noted above, characteristics of slabs 12 and 12' can be used for similar purposes as those described above whether or not the incident radiation is normal to the surface of the slabs.

The periodic index contrasts of structures 12, 12' and 200 in FIGS. 1, 9 and 10 vary along at least one direction, such as a direction in which the index contrasts vary periodically, which may be along a lattice translation vector. For an explanation of the term "lattice translation vector," please see "Introduction to Solid State Physics", by Charles Kittel, seventh edition, (John Wiley & Sons, New York, 1996). pp. 4–5. In FIG. 1, index contrasts vary periodically along lattice translation vectors 15 and 17. In FIG. 9, this is along lattice translation vectors 205 and 207. In FIG. 10, index contrasts vary periodically along lattice translation vector 15'. The radiation is preferably directed to the structures 12, 12' and 200 in a direction that is not along the direction(s) in which the periodic index contrasts vary periodically, and more preferably in a direction that is away from such direction. In some of the embodiments, the radiation is directed to the structures 12, 12' and 200 in a direction that is substantially normal to the direction(s) in which the periodic index contrasts of the structures vary periodically, such as along direction 18 shown in such figures.

FIG. 11 is a schematic view of a displacement-sensitive photonic crystal structure 300 comprising at least one photonic crystal slab 12 and a reflective medium 302 to illustrate yet one more embodiment of the invention. In one implementation, medium 302 comprises a distributed Bragg mirror, such as one formed by alternate layers of materials having different dielectric costants. Structure 300 can be used in a manner similar to structures 10 and 200 described above, with all the attendant advantages also described above.

While the invention has been described above by reference to various embodiments, it will be understood that changes and modifications may be made without departing from the scope of the invention, which is to be defined only by the appended claims and their equivalent. All references referred to herein are incorporated by reference in their entireties.

What is claimed is:

1. A photonic device comprising:
   a medium of dielectric material with a substantially periodic one or two dimensionally periodic index contrast introduced into the dielectric material so that said medium has at least one resonant mode at a resonance frequency, so that the index of the medium varies periodically along at least one direction, and so that electromagnetic radiation incident upon the medium is substantially completely reflected over a range of frequencies, said range being greater than about 1% of the resonance frequency; and
   a device directing electromagnetic radiation towards the medium along a path that is not along or parallel to said at least one direction.

2. The device of claim 1, wherein said medium has a periodic array of air holes having diameters of at least 0.2a, where a is the period of the array.

3. The device of claim 1, wherein said at least one direction is along a lattice translation vector of the medium of dielectric material.

4. The device of claim 1, wherein the index contrast of the medium varies periodically along two directions, and said path is not along or parallel to the two directions.

5. A method for designing a photonic reflector or filter comprising:
   providing a dielectric material; and
   causing a substantially periodic one or two dimensionally periodic index contrast to be introduced into the material by introducing into the material a periodic array of air holes, said holes having diameters of at least 0.2a, where a is the period of the array so that the material has a scattering strength thereby causing it to be substantially completely reflective over a range of frequencies;
   selecting a dimension related to said index contrast that is introduced so that the material has a scattering strength thereby causing it to be substantially completely reflective over a range of frequencies, said range being greater than about 1% of the resonance frequency.

* * * * *